(12) United States Patent
Kaneda

(10) Patent No.: US 12,175,150 B2
(45) Date of Patent: Dec. 24, 2024

(54) INFORMATION PROCESSING SYSTEM, INFORMATION PROCESSING DEVICE, IMAGE FORMING DEVICE, AND CONTROL METHOD THEREFOR, AND STORAGE MEDIUM FOR DISPLAYING INFORMATION

(71) Applicant: CANON KABUSHIKI KAISHA, Tokyo (JP)

(72) Inventor: Kanako Kaneda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/470,016

(22) Filed: Sep. 19, 2023

(65) Prior Publication Data

US 2024/0004598 A1    Jan. 4, 2024

Related U.S. Application Data

(63) Continuation of application No. 17/863,289, filed on Jul. 12, 2022, now Pat. No. 11,789,684, which is a continuation of application No. 17/187,570, filed on Feb. 26, 2021, now Pat. No. 11,403,056.

(30) Foreign Application Priority Data

Mar. 4, 2020    (JP) ................. 2020-037223

(51) Int. Cl.
*G06F 3/12*    (2006.01)

(52) U.S. Cl.
CPC .......... *G06F 3/1292* (2013.01); *G06F 3/1205* (2013.01); *G06F 3/1273* (2013.01)

(58) Field of Classification Search
None
See application file for complete search history.

(56) References Cited

U.S. PATENT DOCUMENTS

2009/0036056 A1*    2/2009    Oshima ............. H04M 1/72412
                                                 455/41.3

* cited by examiner

*Primary Examiner* — Thomas D Lee
(74) *Attorney, Agent, or Firm* — Canon U.S.A., Inc. IP Division

(57) ABSTRACT

Setting information, which is stored in an image forming device, is imported to a mobile terminal when the mobile terminal is brought close to the image forming device by sending the setting information stored in the image forming device from the image forming device to the mobile terminal.

19 Claims, 15 Drawing Sheets

FIG.6
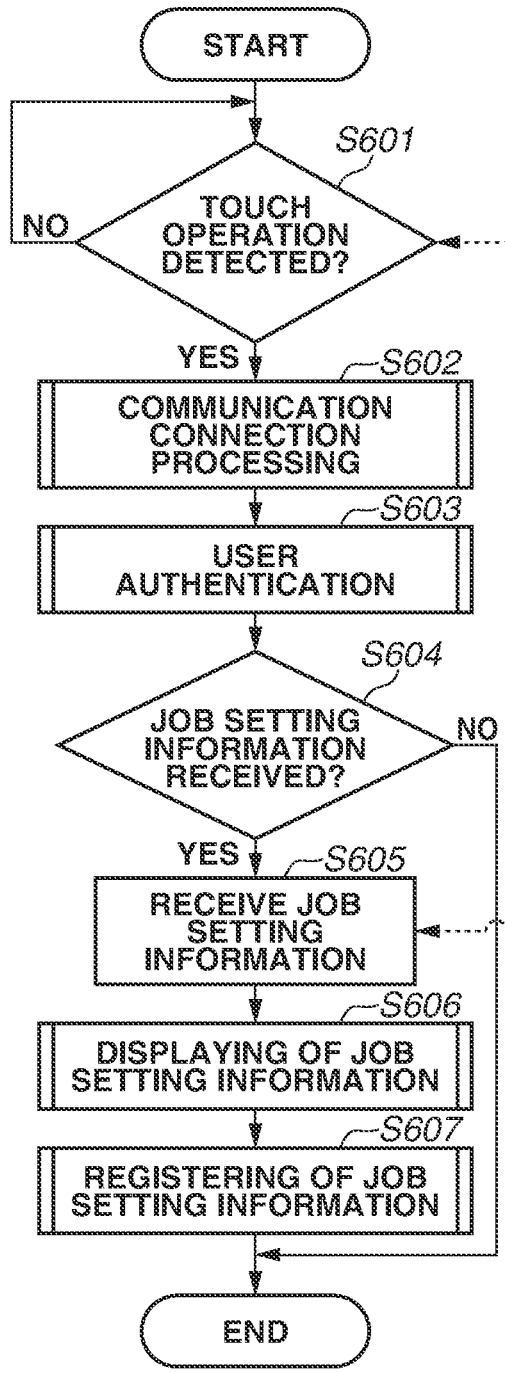
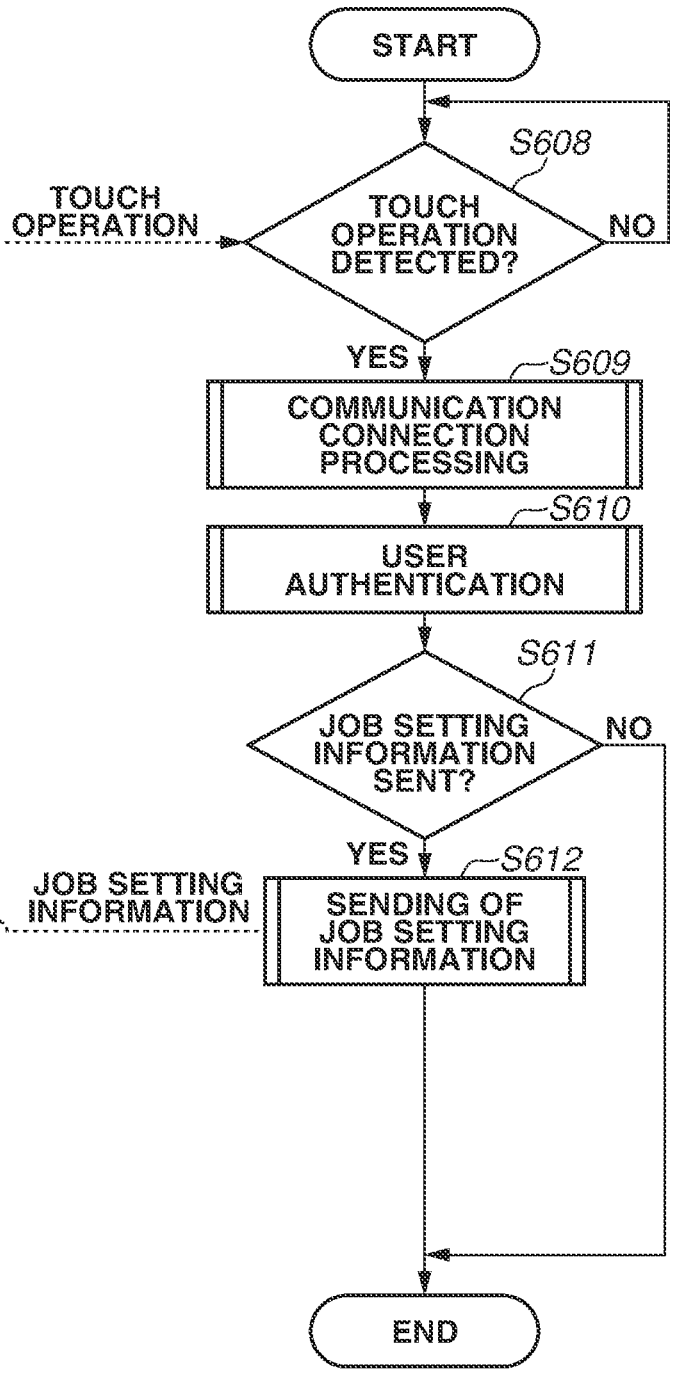

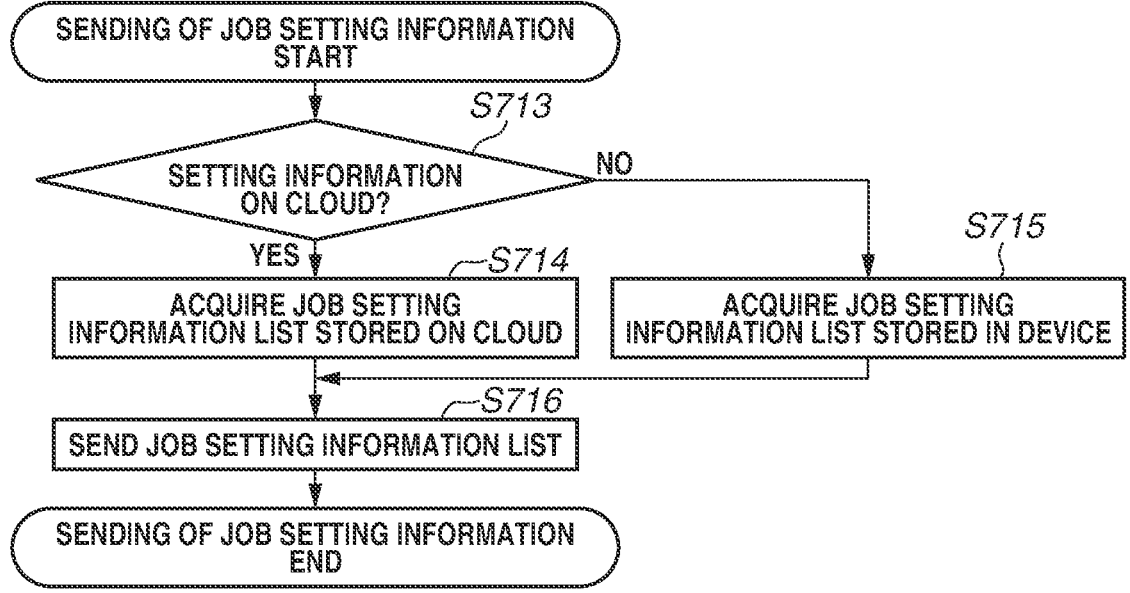
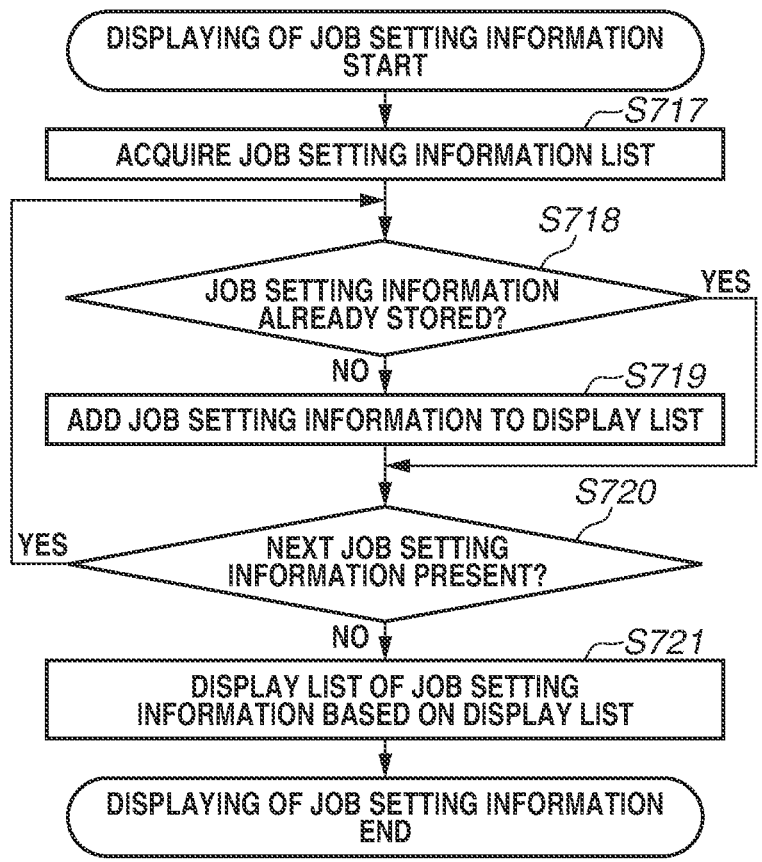
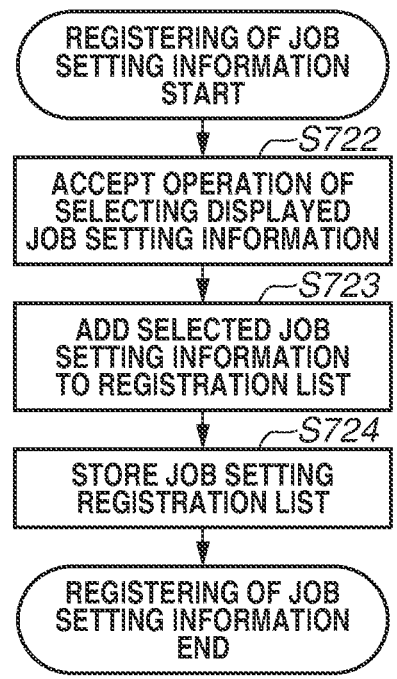

FIG.9A

902 JOB SETTING INFORMATION LIST

| ID | TYPE | USER | JOB TYPE | PARAMETER LIST |
|---|---|---|---|---|
| 0001 | PRESET | AAA | SCAN | {ADDRESS: aaa@mail.co.jp, FILE NAME: tmp.pdf, COLOR: COLORED, SIZE: A4, FILE FORMAT: PDF} |
| 0002 | FAVORITE | AAA | COPY | {COLOR: MONOCHROME, SIZE: A4, NUMBER OF COPIES: 5, READING: SINGLE-SIDED, PRINTING: DOUBLE-SIDED} |
| 0003 | PRESET | AAA | PRINT | {ADDRESS: bbb@mail.co.jp, FILE NAME: MATERIAL.pdf, COLOR: COLORED, SIZE: A4, FILE FORMAT: PDF} |
| 0004 | FAVORITE | AAA | FAX | {NO.: 0123456789, SIZE: A4, READING: SINGLE-SIDED} |
| 0005 | FAVORITE | AAA | SCAN | {ADDRESS: bbb@mail.co.jp, FILE NAME: REPORT MATERIAL.pdf, COLOR: COLORED, SIZE: A4, FILE FORMAT: PDF} |
| 0006 | PRESET | AAA | SCAN | {ADDRESS: aaa@mail.co.jp, FILE NAME: tmp.pdf, COLOR: COLORED, SIZE: A4, FILE FORMAT: PDF} |
| ... | ... | ... | ... | ... |

908 JOB HISTORY LIST

| TIME | TYPE | USER | JOB TYPE | PARAMETER LIST |
|---|---|---|---|---|
| 2019/11/26 17:00 | HISTORY | AAA | PRINT | {FILE NAME: TABLE.xlsx, COLOR: COLORED, SIZE: A3, NUMBER OF COPIES: 10} |
| 2019/11/26 12:00 | HISTORY | AAA | COPY | {COLOR: MONOCHROME, SIZE: A4, NUMBER OF COPIES: 5, READING: SINGLE-SIDED, PRINTING: DOUBLE-SIDED} |
| 2019/11/26 9:30 | HISTORY | AAA | SCAN | {ADDRESS: bbb@mail.co.jp, FILE NAME: REPORT MATERIAL.pdf, COLOR: COLORED, SIZE: A4, FILE FORMAT: PDF} |
| 2019/11/25 15:00 | HISTORY | AAA | FAX | {NO.: 0123456789, SIZE: A4, READING: SINGLE-SIDED} |
| 2019/11/25 9:30 | HISTORY | AAA | SCAN | {ADDRESS: bbb@mail.co.jp, FILE NAME: REPORT MATERIAL 2.pdf, COLOR: COLORED, SIZE: A4, FILE FORMAT: PDF} |
| 2019/11/25 9:30 | HISTORY | AAA | SCAN | {ADDRESS: bbb@mail.co.jp, FILE NAME: REPORT MATERIAL.pdf, COLOR: COLORED, SIZE: A4, FILE FORMAT: PDF} |
| ... | ... | ... | ... | ... |
| 2019/11/1 9:00 | HISTORY | AAA | SCAN | {ADDRESS: bbb@mail.co.jp, FILE NAME: REPORT MATERIAL.pdf, COLOR: COLORED, SIZE: A4, FILE FORMAT: PDF} |

907 909 910 911 912

MAIN MENU SCREEN
1001

JOB SETTING ACQUISITION
INSTRUCTION SCREEN
1002

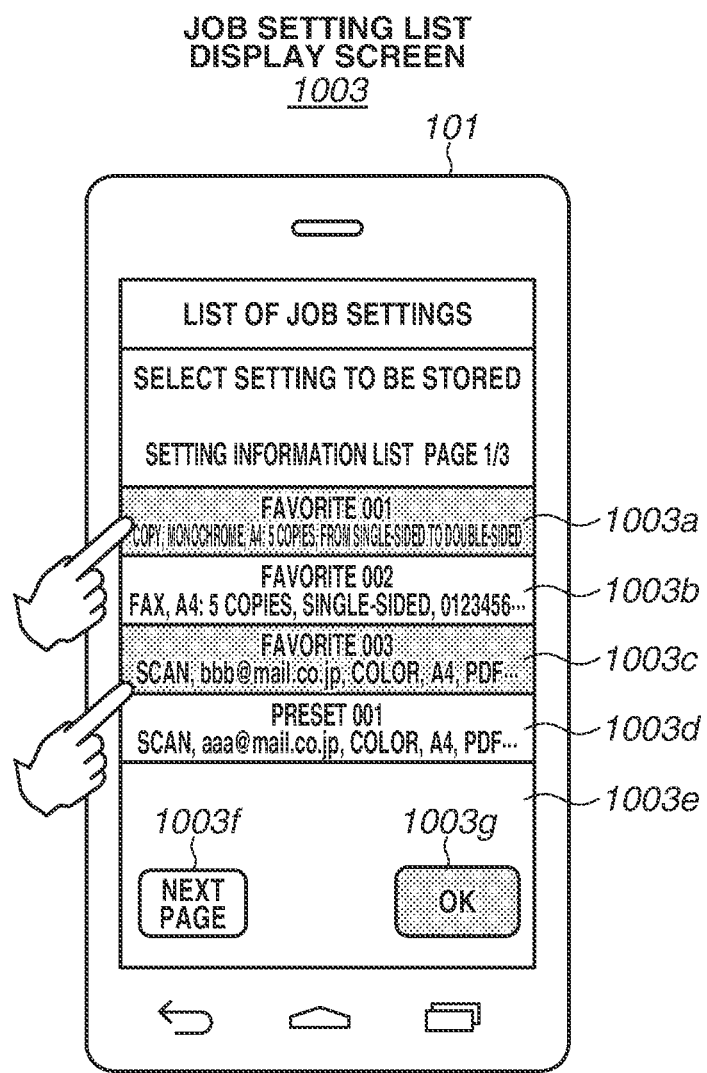

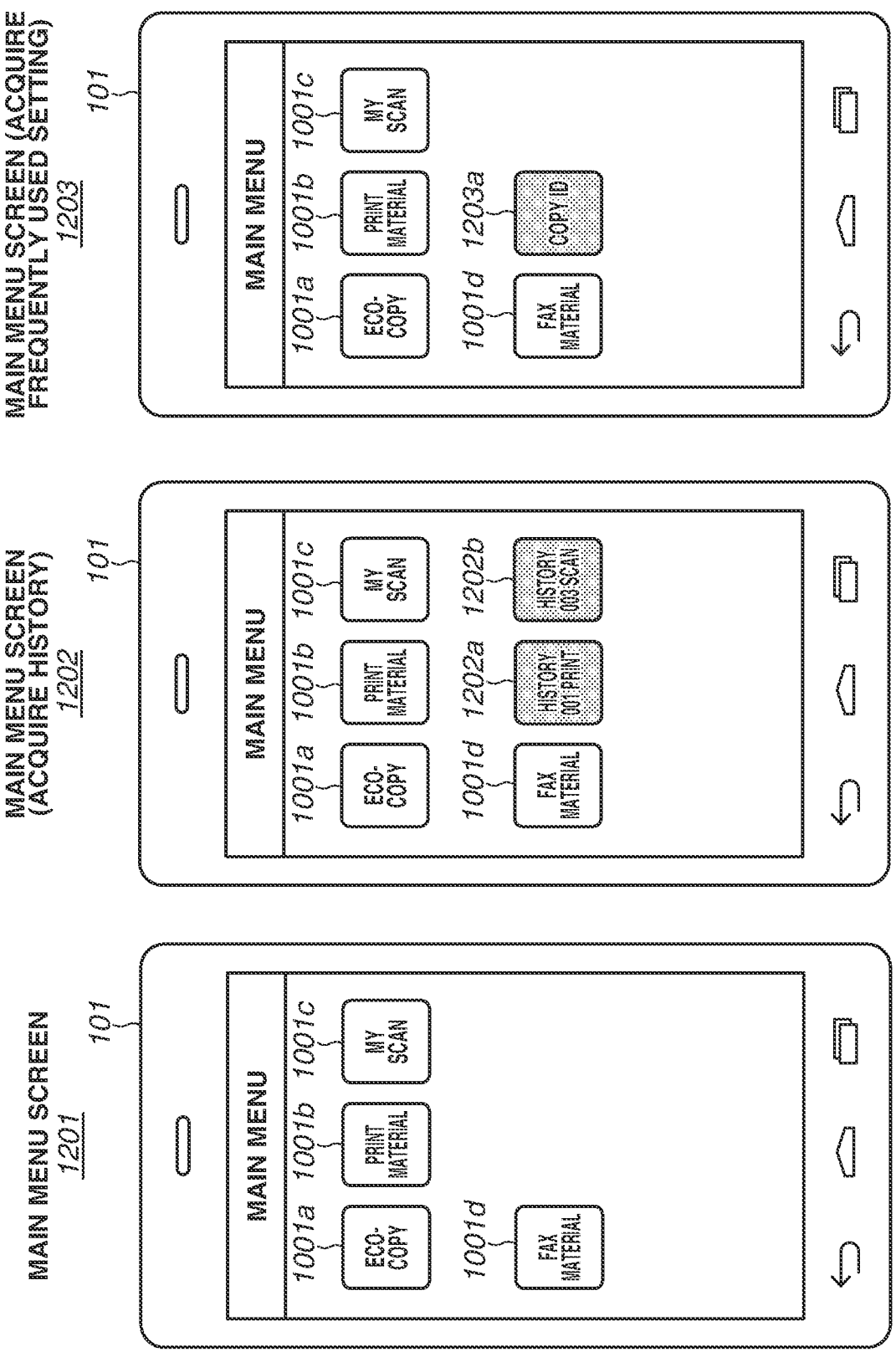

INFORMATION PROCESSING SYSTEM, INFORMATION PROCESSING DEVICE, IMAGE FORMING DEVICE, AND CONTROL METHOD THEREFOR, AND STORAGE MEDIUM FOR DISPLAYING INFORMATION

CROSS-REFERENCE TO RELATED APPLICATIONS

This application is a Continuation of U.S. patent application Ser. No. 17/863,289, filed Jul. 12, 2022, which is a Continuation of U.S. patent application Ser. No. 17/187,570, filed Feb. 26, 2021, now U.S. Pat. No. 11,403,056, which claims the benefit of Japanese Patent Application No. 2020-037223, filed Mar. 4, 2020, all of which are hereby incorporated by reference herein in their entirety.

BACKGROUND

Field

The present disclosure relates to a data processing device that acquires setting information from an image forming device.

Description of the Related Art

In recent years, with the spread of high-performance mobile terminals called smart phones, the number of multifunction peripherals (MFPs) that cooperate with the mobile terminals is increasing. For example, the mobile terminal can issue a print instruction to the MFP by using a wireless communication. The mobile terminal accepts an operation from a user, configures a print job based on any selected print data and various print setting information (for example, color, sheet feed tray, and the number of copies to print), and by sending the print job to the MFP, can cause the MFP to perform print processing. At this time, a wireless communication between the mobile terminal and the image forming device is established according to a communication protocol such as Transmission Control Protocol/Internet Protocol (TCP/IP), near field communication (NFC), or Bluetooth®, and can be realized by a known art.

In addition to the print function, the MFP has various functions such as a scan function, a copy function, and a fax function, and setting information to be set when performing various functions can be registered in the MFP or the mobile terminal. The user can register any frequently used setting information in the MFP or the mobile terminal, and when issuing an execution instruction to the MFP, can call and use the registered setting information. The user may want to use, on the mobile terminal, the setting information registered in the MFP. Therefore, Japanese Patent Application Laid-Open No. 2015-207875 discusses a method in which a mobile terminal can store and use any setting information registered in an MFP.

However, in order for the mobile terminal to acquire and register the setting information registered in the MFP, various operations are required on the MFP or the mobile terminal, which is complicated for the user. Japanese Patent Application Laid-Open No. 2015-207875 does not describe a detailed method for the mobile terminal to store the setting information registered in the MFP.

SUMMARY

Aspects of the present disclosure provide a technique for a mobile terminal to acquire setting information registered in an image forming device without impairing operability to a user.

According to an aspect of the present disclosure, an information processing system includes a terminal and an image forming device that communicate with each other via a short-range wireless communication, wherein the terminal includes a memory and a processor in communication with the memory, wherein the processor performs receiving job setting information from the image forming device, and storing the received job setting information to send a job to an external device using the received job setting information, wherein the image forming device includes a memory and a processor in communication with the memory, wherein the processor performs storing job setting information in the image forming device, and sending the stored job setting information to the terminal, and wherein in response to the short-range wireless communication performed between the terminal and the image forming device, when sending the job setting information is to be performed, the stored job setting information is sent to the terminal and the terminal receives the job setting information.

Further features of the present disclosure will become apparent from the following description of exemplary embodiments with reference to the attached drawings.

BRIEF DESCRIPTION OF THE DRAWINGS

FIG. 6 is a diagram illustrating a flowchart of job setting information registration processing according to the first exemplary embodiment.

FIGS. 7C through 7E are diagrams each illustrating a flowchart of the job setting information registration processing according to the first exemplary embodiment.

FIGS. 9A and 9B are diagrams each illustrating an example of a job setting information list managed by the image forming device according to the first exemplary embodiment.

FIGS. 10A through 10E are diagrams illustrating screens relating to acquisition and registration of job setting information by the data processing device according to the first exemplary embodiment.

FIGS. 12A through 12C are diagrams illustrating screens relating to acquisition and registration of job setting information by a data processing device according to the second exemplary embodiment.

DESCRIPTION OF THE EMBODIMENTS

Hereinafter, exemplary embodiments will be described in detail with reference to the drawings. However, any components described in the exemplary embodiments are merely examples that are not seen to be limiting.

Figure 1:
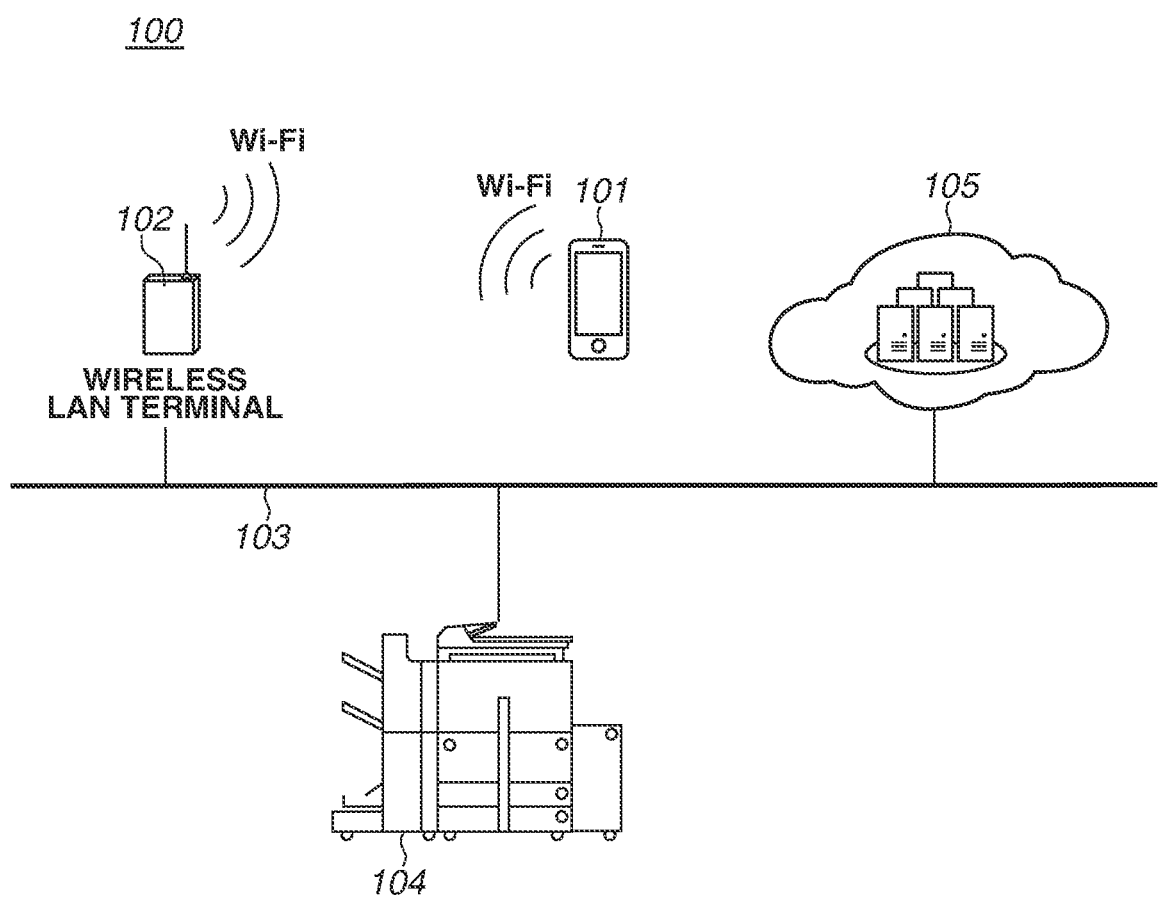
FIG. 1 is a data processing system configuration diagram according to a first exemplary embodiment.

FIG. 1 is a configuration diagram of an information processing system according to a first exemplary embodiment. A data processing system 100 is composed of a data processing device 101, a wireless local area network (LAN) terminal 102, an image forming device 104, and a cloud server 105, and the above devices are connected via a network 103.

The data processing device 101 is, for example, a mobile terminal such as a smart phone or a tablet, and an operating system for a small terminal or a program for controlling a call or data communication may be running. Alternatively, the data processing device 101 may be a personal computer that does not have voice control, position detection control, mobile phone data communication, or the like. In addition, the data processing device 101 is connected to the network 103 by the wireless LAN terminal 102.

The wireless LAN terminal 102 is a master unit of a wireless LAN having a general network router function, and provides a wireless LAN in a home or an office.

The image forming device 104 is a digital multifunction device having various job execution functions such as a printer function, a copy function, a scan function, and a fax transmission function. By operating the data processing device 101, a user can instruct the image forming device 104 to perform the job and can perform various functions of the image forming device 104.

Via the network 103, the cloud server 105 manages the data used by the data processing device 101 and the image forming device 104, and performs expansion processing, or the like of various functions. In the present exemplary embodiment, the image forming device 104 and the cloud server 105 are connected to the network 103 by wire, but they may be wirelessly connected by using the wireless LAN terminal 102 in the same manner as the data processing device 101.

Further, the data processing device 101 and the image forming device 104 can perform a short-range wireless communication via a wireless signal of near field communication (NFC), Bluetooth® Low Energy, or the like. In an NFC communication unit and a Bluetooth® Low Energy communication unit, which will be described below, the image forming device 104 has connection information (Internet Protocol (IP) address, media access control (MAC) address, or the like) for wireless LAN connection with the image forming device 104, and the data processing device 101 acquires the connection information by the short-range wireless communication. Then, the data processing device 101 and the image forming device 104 start the wireless LAN communication based on the acquired connection information. That is, by changing from the connection information exchanged by the short-range wireless communication such as the NFC communication or the Bluetooth® Low Energy communication between the devices to the wireless LAN communication such as Wi-Fi® (called a handover method), the wireless LAN communication of the data processing device 101 and the image forming device 104 is established.

Figure 2:
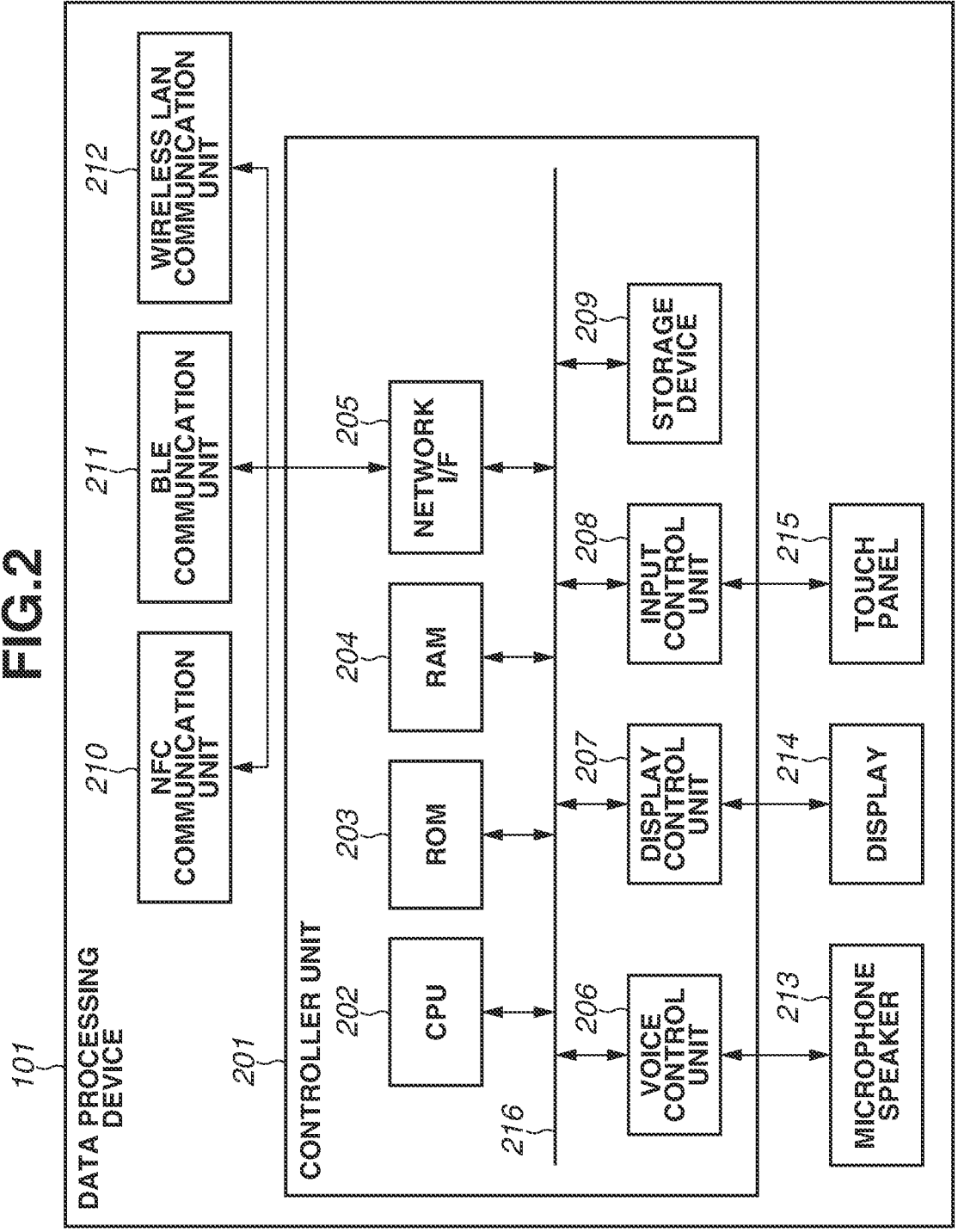
FIG. 2 is a block diagram illustrating a hardware configuration of a data processing device according to the first exemplary embodiment.

FIG. 2 is a block diagram illustrating a hardware configuration of the data processing device 101 according to the present exemplary embodiment.

The data processing device 101 has a controller unit 201. The controller unit 201 controls various communication units such as an NFC communication unit 210, a Bluetooth® Low Energy communication unit 211, and a wireless LAN communication unit 212, and various user interface (UI) units such as a microphone speaker 213, a display 214, and a touch panel 215.

The controller unit 201 is composed of a central processing unit (CPU) 202, a read only memory (ROM) 203, a random access memory (RAM) 204, a network interface (I/F) 205, a voice control unit 206, a display control unit 207, an input control unit 208, and a storage device 209, which are connected by a system bus 216.

The CPU 202 controls the entire system of the data processing device 101. The ROM 203 stores an operating system of the data processing device 101 and applications that control calls and data communications, and the CPU 202 performs various programs. The RAM 204 is a memory for the CPU 202 to perform various programs, and a work memory area for the application to perform the programs.

The storage device 209 is a non-volatile storage device, and records various operation mode settings, operation logs, or the like that need to be retained even after the data processing device 101 is restarted. In particular, in the present exemplary embodiment, the storage device 209 stores the setting information used when instructing the image forming device 104 to perform, the setting information acquired from the image forming device 104, and the like.

The network I/F 205 is connected to the NFC communication unit 210, the Bluetooth® Low Energy communication unit 211, and the wireless LAN communication unit 212, and performs various wireless communication controls with the image forming device 104 and the cloud server 105.

The voice control unit 206 controls the input/output of the voice data via the microphone speaker 213. The display control unit 207 controls the output of the image data displayed on the display 214. The input control unit 208 controls the input of the information instructed by the user via a button or the touch panel 215. Using these voice control unit 206, display control unit 207, and input control unit 208, various applications performed by the data processing device 101 are provided to the user.

Figure 3:
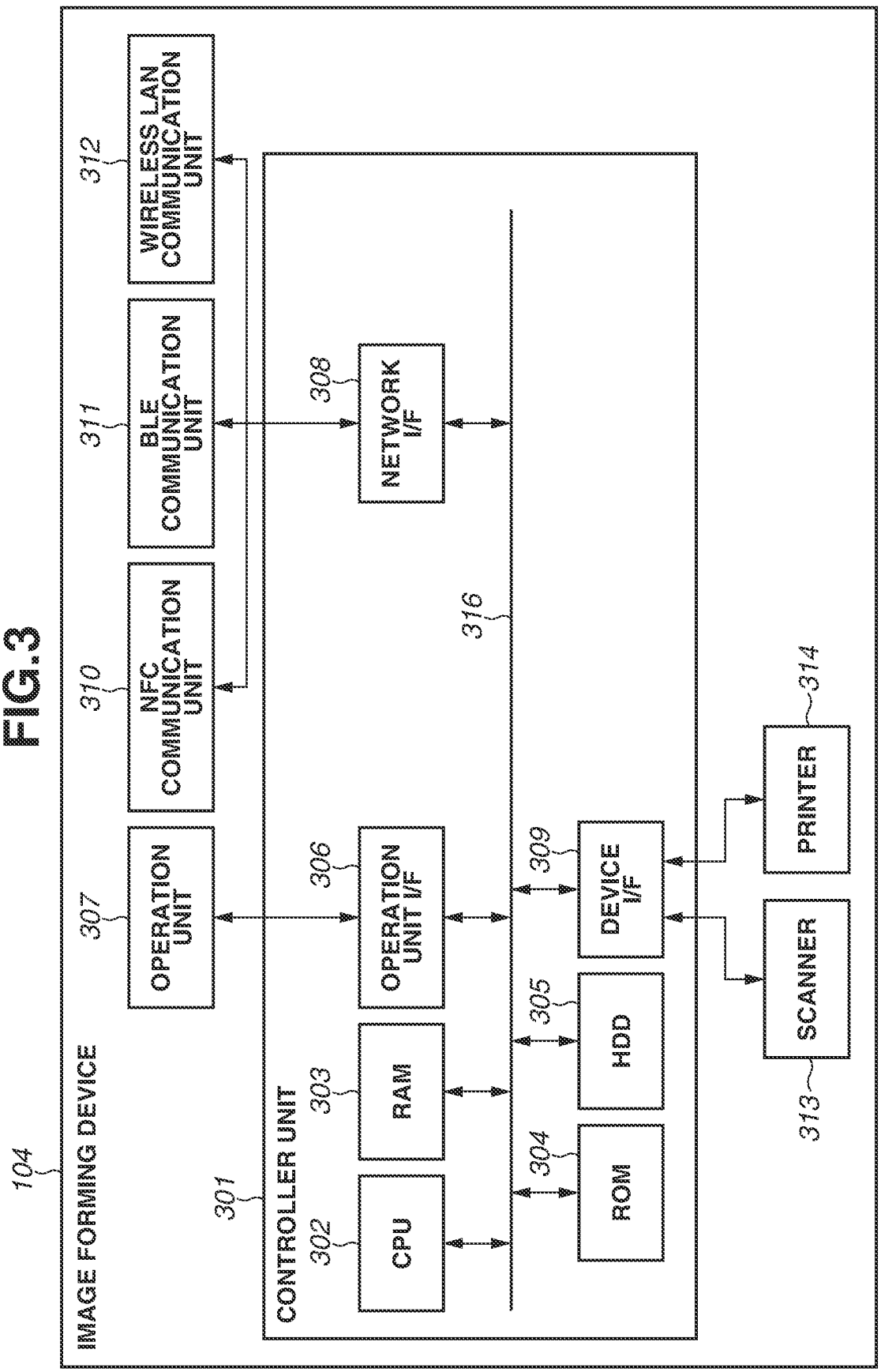
FIG. 3 is a block diagram illustrating a hardware configuration of an image forming device according to the first exemplary embodiment.

FIG. 3 is a block diagram illustrating a hardware configuration of the image forming device 104 according to the present exemplary embodiment.

The image forming device 104 has a controller unit 301, and the controller unit 301 controls various communication units such as an NFC communication unit 310, a Bluetooth® Low Energy communication unit 311, and a wireless LAN communication unit 312, and in addition, an operation unit 307, a scanner 313, and a printer 314. When the user uses the copy function, the controller unit 301 controls the scanner 313 to thereby acquire the image data of an original document, and controls the printer 314 to thereby print and output an image on a sheet. In addition, when the user uses the scan function, the controller unit 301 controls the scanner 313 to thereby acquire the image data of an original document, converts the acquired image data into code data, and sends the code data to the data processing device 101, the cloud server 105, or the like via the network 103. Further, when the user uses the print function, the controller unit 301 receives the image data (code data) via the data processing device 101, the cloud server 105, or the network 103. Then, the controller unit 301 converts the received print data into image data and sends the image data to the printer 314. Based on the received image data, the printer 314 prints an image on a sheet to output the image. In addition, the image forming device 104 also has a fax receiving function for receiving and printing data from the Integrated Services Digital Network (ISDN), or the like, and a fax sending function for sending scanned data to the ISDN, or the like. The work for performing each of these functions is called a job, and the image forming device 104 performs a predetermined process according to the job which corresponds to each function.

The controller unit 301 is composed of a CPU 302, a RAM 303, a ROM 304, a hard disk drive (HDD) 305, an operation unit I/F 306, a network I/F 308, and a device OF 309, and they are connected by a system bus 316.

The CPU 302 controls the entire system of the image forming device 104. The RAM 303 is a system work memory for operating the CPU 302, and is also an image memory for temporarily storing image data and setting data. In addition, the RAM 303 is also equipped with programs and data such as an operating system, system software, and application software. In addition, the RAM 303 stores any scan image data read by the scanner 313, and stores the print image data received from the data processing device 101 via the network 103. The ROM 304 stores a boot program of the system. The HDD 305 stores an operating system, system software, application software, image data, setting data, or the like.

The operation unit I/F 306 is an interface unit with the operation unit 307, and outputs, to the operation unit 307, information to be displayed on the operation unit 307. The operation unit I/F 306 also accepts from the operation unit 307 the information entered by the user.

The network I/F 308 is connected to the NFC communication unit 310, the Bluetooth® Low Energy communication unit 311, and the wireless LAN communication unit 312, and performs various wireless communication controls with the data processing device 101 and the cloud server 105. The wireless LAN communication unit 312 forms a wireless LAN with the data processing device 101 via the network 103. In addition, the NFC communication unit 310 and the Bluetooth® Low Energy communication unit 311 perform a short-range wireless communication with the data processing device 101 via wireless signals. The image forming device 104 sends and receives job setting information and image data to and from the data processing device 101 via the network OF 308, and performs the job received from the data processing device 101. Hereinafter, the setting information given to the job is referred to as job setting information. For example, in the case of a print job, the setting information such as the number of copies given to the print job: 1, color setting: monochrome, size: A4 is used as the job setting information.

The device I/F 309 connects the scanner 313 for reading image data and the printer 314 for printing to the controller unit 301, and inputs and outputs the image data.

Figure 4:
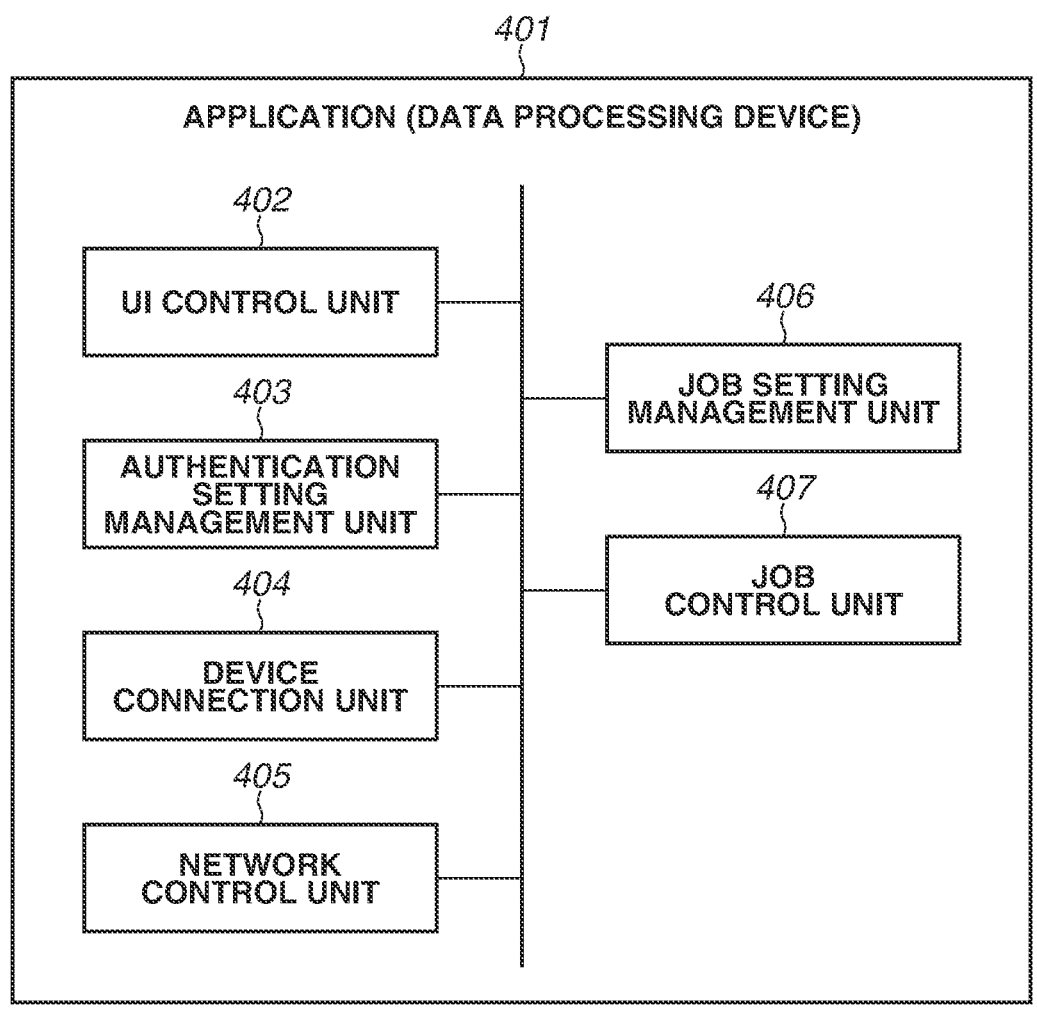
FIG. 4 is a block diagram illustrating a software configuration of the data processing device according to the first exemplary embodiment.

FIG. 4 is a block diagram illustrating the software configuration of the data processing device 101 according to the present exemplary embodiment.

An application 401 is software performed by the CPU 202 of the data processing device 101, and is stored in the RAM 204, the storage device 209, and the like.

A UI control unit 402 accepts the settings (job setting information) input by the user with the touch panel 215 and sends settings to a job setting management unit 406 via the input control unit 208. In addition, the UI control unit 402 receives a response from the job setting management unit 406 and a job control unit 407, and outputs the information to the display 214 via the display control unit 207. Further, the UI control unit 402 accepts authentication information input by the user with the touch panel 215, and sends the accepted authentication information to an authentication setting management unit 403 via the input control unit 208.

To the network control unit 405, the authentication setting management unit 403 sends the authentication information such as the user information received from the UI control unit 402. Via the network 103, the authentication information is used in the authentication processing which will be described below and performed in the image forming device 104. In addition, authentication information such as user information may be stored in the authentication setting management unit 403.

A device connection unit 404 establishes a short-range wireless communication by the NFC communication unit 210 and Bluetooth® Low Energy communication unit 211 of the data processing device 101 and the NFC communication unit 310 and Bluetooth® Low Energy communication unit 311 of the image forming device 104, or the wireless LAN communication via the network 103. For example, in the case of the NFC, the user starts the short-range wireless communication by bringing the NFC communication unit 210 of the data processing device 101 and the NFC communication unit 310 of the image forming device 104 closer to each other. In the case of the Bluetooth® Low Energy, the user brings the Bluetooth® Low Energy communication unit 211 of the data processing device 101 closer to the Bluetooth® Low Energy communication unit 311 of the image forming device 104. Then, when the radio strength of a Bluetooth® Low Energy beacon received from the image forming device 104 is equal to or greater than a certain value, the device connection unit 404 starts a bidirectional short-range wireless communication. In this way, the user performs an operation (called a touch operation) to bring the NFC and Bluetooth® Low Energy communication units of the data processing device 101 and the image forming device 104 closer to each other, so that the device connection unit 404 can acquire, from the image forming device 104, the connection information (IP address, or the like) required for the wireless LAN communication. Then, using the acquired connection information, the data processing device 101 starts a wireless LAN connection with the image forming device 104. Further, it may be so established that, without performing the short-range wireless communication, the data processing device 101 reads a Quick Response code (QR Code®) indicating the connection information displayed on the image forming device 104, so that the image forming device 104 and the data processing device 101 establish the wireless LAN communication.

The network control unit 405 sends the job (including job setting information, execution instruction command, image data, or the like), user authentication information, or the like to the image forming device 104 via the network 103. Further, via the network 103, the network control unit 405 receives the job setting information stored in the image forming device 104.

In the RAM 204 or the storage device 209, the job setting management unit 406 stores the job setting information input by the user via the UI control unit 402 and the job setting information received from the image forming device 104 or the cloud server 105 by the network control unit 405. At this time, the job setting management unit 406 manages these pieces of job setting information as "favorite", which is a setting often used by users. In addition, the job setting management unit 406 manages, as "preset", the job setting information stored in advance in the RAM 204 and the storage device 209 at the time of installation of the application 401.

From the job setting information such as "favorite" and "preset" registered in the job setting management unit 406, the job control unit 407 generates information to be instructed to perform the job, and sends a job performance instruction to the image forming device 104 via the network 103. In addition, the job control unit 407 acquires the job performance status and also the operating state of the devices such as the scanner 313 and the printer 314 from the image forming device 104 via the network 103, and sends them to the UI control unit 402.

Figure 5:
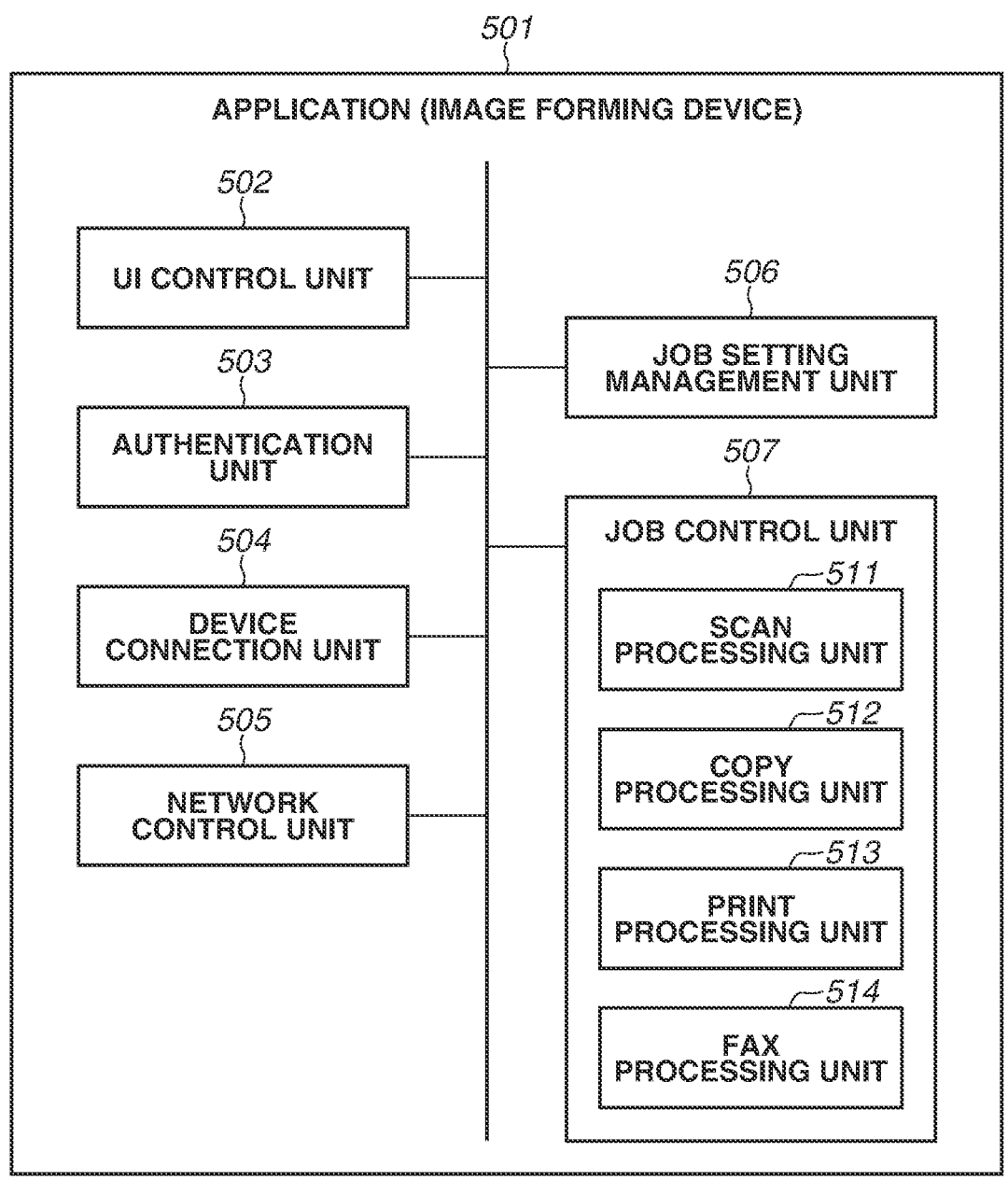
FIG. 5 is a block diagram illustrating a software configuration of the image forming device according to the first exemplary embodiment.

FIG. 5 is a block diagram illustrating a software configuration of the image forming device 104 according to the present exemplary embodiment.

An application 501 is software performed by the CPU 302 of the image forming device 104, and is stored in the RAM 303, the HDD 305, or the like.

A UI control unit 502 accepts the job setting information and the like input by the user in the operation unit 307 and sends them to a job setting management unit 506. In addition, the UI control unit 502 receives a response from a job setting management unit 506 and a job control unit 507, and outputs the information to the operation unit 307.

An authentication unit 503 performs user identification processing and user authentication processing based on the authentication information received from the data processing device 101, and returns the result.

A device connection unit 504 performs a short-range wireless communication between the data processing device 101 and the image forming device 104, and establishes a wireless LAN communication via the network 103.

A network control unit 505 receives a job (job setting information, job performance instruction command, image data), user authentication information, or the like from the data processing device 101 via the network 103. Further, to the data processing device 101 via the network 103, the network control unit 505 sends the job setting information stored in the image forming device 104.

In the RAM 303 or the HDD 305, the job setting management unit 506 stores the job setting information input by the user with the UI control unit 502 and the job setting information received from the data processing device 101 or the cloud server 105 with the network control unit 505. At this time, the job setting management unit 506 manages these pieces of job setting information as "favorite", which is a setting often used by users. In addition, the job setting management unit 506 manages, as a "preset", the job setting information stored in the RAM 303 and the HDD 305 at the time of installation of the application 501. In addition, the job setting information included in the job performed by the image forming device 104 is managed as a "history".

The job control unit 507 controls each of a scan processing unit 511, a copy processing unit 512, a print processing unit 513, and a fax processing unit 514 according to the received job, and performs various jobs. At this time, the job control unit 507 performs the job based on the job setting information set by the user with the operation unit 307 and the job setting information of "favorite" and "preset" registered in the job setting management unit 506. Further, the job control unit 507 receives, via the network 103, a job execution request received from the data processing device 101, and performs various jobs according to the received job setting information of the job. In addition, the job control unit 507 sends the job performance status and also sends the operation status of devices such as the scanner 313 and the printer 314 to the data processing device 101 via the network 103.

FIG. 6 is a flowchart of a job setting registration process in the data processing device 101 and the image forming device 104 according to the present exemplary embodiment.

Steps S601 to S607 in FIG. 6 constitute a flow performed by the CPU 202 according to the application 401 stored in the RAM 204, the storage device 209, or the like included in the data processing device 101.

In step S601, the device connection unit 404 detects whether the data processing device 101 has been touched by the image forming device 104. If a touch is detected, the operation proceeds to step S602, and if not detected, the processing repeats step S601. The detection determination here uses, for example, whether a short-range wireless communication by NFC or Bluetooth® communication has been accomplished.

In step S602, the device connection unit 404 performs a communication connection with the image forming device 104 by a wireless LAN communication. When the data processing device 101 can make the communication connection, the data processing device 101 may send, to the image forming device 104, a request for acquisition of the job setting information. Then, the operation proceeds to step S603.

In step S603, the authentication setting management unit 403 sends the authentication information of the user to the image forming device 104, and instructs the image forming device 104 to perform the authentication processing. Then, the operation proceeds to step S604. The configuration of the authentication processing is not mandatory.

In step S604, the job setting management unit 406 determines whether the job setting information has been sent from the image forming device 104. When the job setting information has been sent (Yes in step S604), the operation proceeds to step S605. If not (No in step S604), the operation ends the flow.

In step S605, the job setting management unit 406 receives the job setting information sent from the image forming device 104. Then, the operation proceeds to step S606.

In step S606, the job setting management unit 406 instructs the UI control unit 402 to perform displaying which is based on the received job setting information. With this, the job setting information acquired from the image forming device 104 is displayed on the display 214 of the data processing device 101. Then, the operation proceeds to step S607.

In step S607, according to the user selection received by the UI control unit 402, the job setting management unit 406 stores and registers the job setting information received in step S605.

Steps S608 to S612 in FIG. 6 constitute a flow performed by the CPU 302 according to the application 501 stored in the RAM 303 and the HDD 305 included in the image forming device 104.

In step S608, the device connection unit 504 determines whether the data processing device 101 has been touched. When the data processing device 101 has been touched, the operation proceeds to step S609, otherwise repeats step S608.

In step S609, the device connection unit 504 performs a communication connection with the data processing device 101 by a wireless LAN communication. This processing corresponds to step S602.

In step S610, the authentication unit 503 performs the authentication processing based on the user information received from the data processing device 101. In addition, the authentication unit 503 sends a authentication processing completion notification to the data processing device 101.

In step S611, the job setting management unit 506 acquires the job setting information stored and managed by the image forming device 104, and determines whether to send the job setting information to the data processing device 101. When the job setting management unit 506 sends the job setting information (Yes in step S611), the processing moves to step S612. When the job setting management unit 506 does not send the job setting information (No in step S611), the operation ends the flow. For example, when there is job setting information registered in the image forming device 104, it is determined that the job setting information is sent, and when there is no job setting information registered in the image forming device 104, it is determined that the job setting information is not sent. In addition, when a job setting information acquisition request is received from the data processing device 101, it is determined that the job setting information will be sent, otherwise it is determined that the job setting information will not be sent. Information to the effect that the data is not sent may be sent to the data processing device 101.

In step S612, to the data processing device 101, the job setting management unit 506 sends the job setting information stored and managed by the image forming device 104.

When the user causes the data processing device 101 to touch the image forming device 104, the processing in steps S601 to S606 and the processing in steps S608 to S612 of this flowchart automatically proceed. By doing so, the user, only by the touch operation, can import, to the data processing device 101, the setting information registered in the image forming device 104.

FIGS. 7A through 7E are flowcharts illustrating the processing by the data processing device 101 and the image forming device 104 according to the present exemplary embodiment.

Figure 7A:
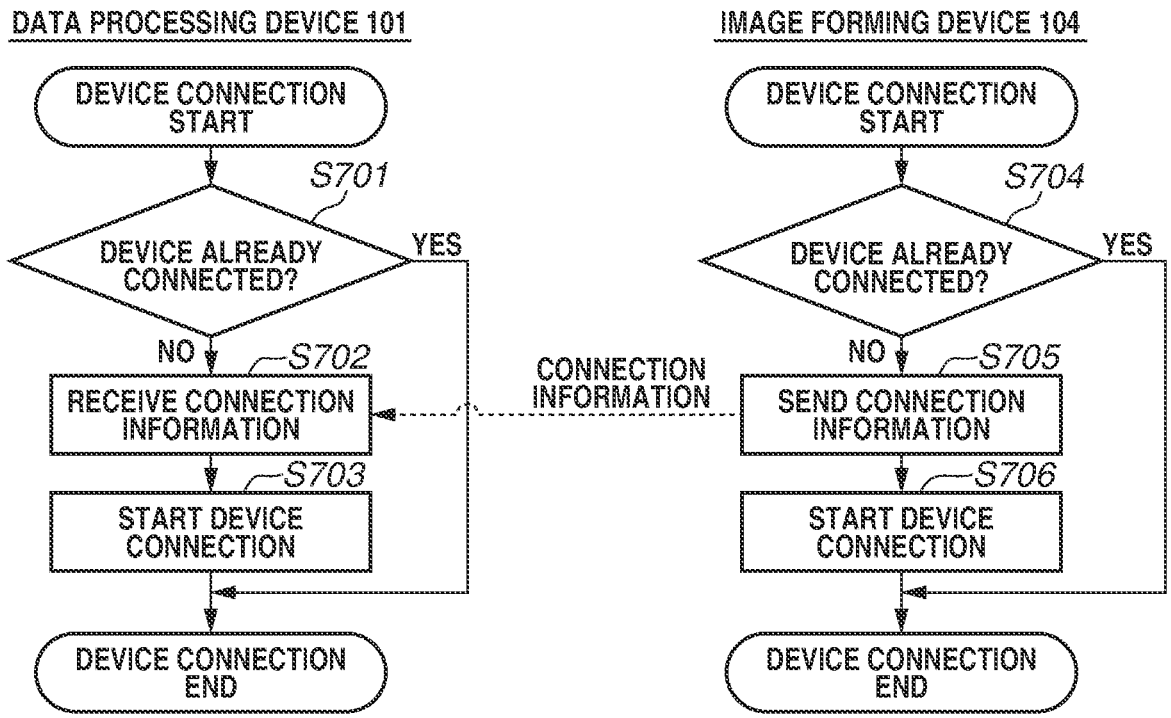
FIGS. 7A and 7B are diagrams each illustrating a flowchart of the job setting information registration processing according to the first exemplary embodiment.

FIG. 7A is a flowchart of communication connection processing in the data processing device 101 and the image forming device 104 according to the present exemplary embodiment.

Steps S701 to S703 in FIG. 7A constitute a flow performed by the CPU 202 according to the application 401 stored in the data processing device 101. Steps S701 to S703 correspond to the processing in step S602 in FIG. 6.

In step S701, the device connection unit 404 determines whether the communication connection with the image forming device 104 is completed. In a case where the connection with the image forming device 104 is completed (Yes in step S701), the operation ends the flow. In a case where the device connection with the image forming device 104 is not completed (No in step S701), the operation proceeds to step S702.

In step S702, the device connection unit 404 receives connection information such as an IP address sent from the image forming device 104 using Bluetooth® Low Energy or NFC. Then, the operation proceeds to S703.

In step S703, the device connection unit 404 establishes a wireless LAN communication with the image forming device 104 based on the received connection information.

Steps S704 to S706 in FIG. 7A constitute a flow performed by the CPU 302 according to the application 501 stored in the image forming device 104. Steps S704 to S706 correspond to the processing in step S609 in FIG. 6.

In step S704, the device connection unit 504 determines whether the communication connection with the data processing device 101 has been completed. In a case where the connection with the data processing device 101 is completed (Yes in step S704), the operation ends the flow. In a case where the device connection with the data processing device 101 is not completed (No in step S704), the operation proceeds to step S705.

In step S705, by using the short-range wireless communication, the device connection unit 504 sends connection information to the data processing device 101 via the NFC communication unit 310 and the Bluetooth® Low Energy communication unit 311 of the image forming device 104. Then, the operation proceeds to S706.

In step S706, the device connection unit 504 establishes a wireless LAN communication with the data processing device 101.

Figure 7B:
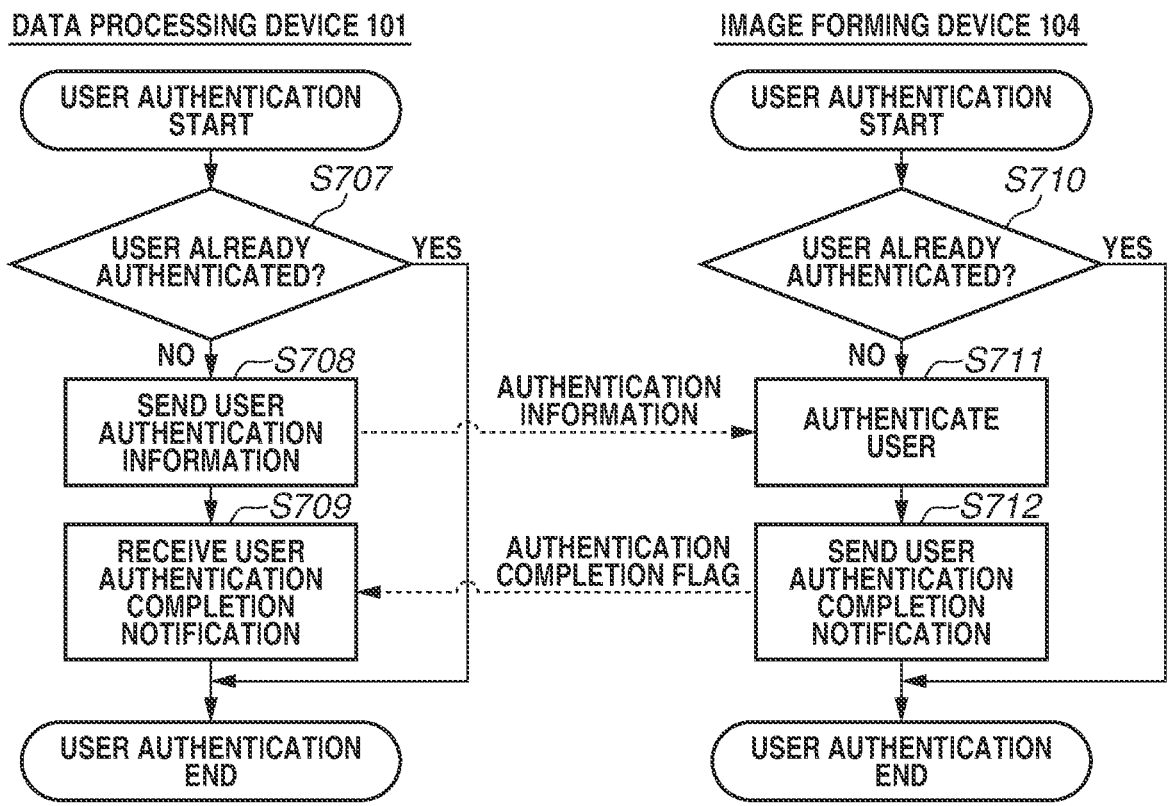

FIG. 7B is a flowchart of the user authentication processing in the data processing device 101 and the image forming device 104 according to the present exemplary embodiment.

Steps S707 to S709 in FIG. 7B constitute a flow performed by the CPU 202 according to the application 401 stored in the data processing device 101. Steps S707 to S709 correspond to the processing in step S603 in FIG. 6.

In step S707, the authentication setting management unit 403 determines whether the user authentication has been completed in the image forming device 104. In a case where the user authentication in the image forming device 104 has been completed (Yes in step S707), the operation ends the flow. In a case where the user authentication in the image forming device 104 is not completed (No in step S707), the operation proceeds to step S708.

In step S708, the authentication setting management unit 403 sends the user's authentication information to the image forming device 104. Then, the operation proceeds to step S709.

In step S709, the authentication setting management unit 403 receives, from the image forming device 104, a flag indicating that the user authentication has been completed, thereby determines that the authentication is completed, and ends the processing.

Steps S710 to S712 in FIG. 7B constitute a flow performed by the CPU 302 according to the application 501 stored in the image forming device 104. Steps S710 to S712 correspond to the processing in step S610 in FIG. 6.

In step S710, the authentication unit 503 determines whether the user authentication in the image forming device 104 has been completed. In a case where the user authentication in the image forming device 104 has been completed (Yes in step S710), the operation ends the flow. In a case where the user authentication in the image forming device 104 is not completed (No in step S710), the operation proceeds to step S711.

In step S711, the authentication unit 503 performs the user authentication based on the user authentication information received from the data processing device 101. When the authentication is successful, the operation proceeds to step S712.

In step S712, the authentication unit 503 makes a notification of the completion of the authentication, by sending, to the data processing device 101, a flag indicating that the user authentication has been completed.

FIG. 7C is a flowchart of the transmission processing of the job setting information in the image forming device 104 according to the present exemplary embodiment. The processing corresponds to the processing in step S612 in FIG. 6.

In step S713, the job setting management unit 506 determines whether the network connection between the image forming device 104 and the cloud server 105 has been established in the network control unit 505. Further, when the image forming device 104 is connected to the cloud, the job setting management unit 506 determines whether the job setting information is stored in the cloud. When the image forming device 104 is connected to the cloud and the job setting information is stored in the cloud (Yes in step S713), the operation proceeds to step S714. If not (No in step S713), the operation proceeds to step S715.

In step S714, the job setting management unit 506 instructs the network control unit 505 to acquire the job setting information list stored on the cloud server 105. The job setting information list will be described below in FIGS. 9A and 9B. Then, the job setting management unit 506 acquires the job setting information list acquired by the network control unit 505 from the cloud server 105. Then, the operation proceeds to step S716. Here, the job setting information list is a list that includes one or more pieces of job setting information registered in the image forming device 104.

In step S715, the job setting management unit 506 acquires the job setting information list stored in the RAM 303 and the HDD 305 of the image forming device 104. Then, the operation proceeds to step S716.

In step S716, the job setting management unit 506 sends, to the data processing device 101, the job setting information lists acquired in steps S714 and S715.

FIG. 7D is a flowchart of the display processing of the job setting information in the data processing device 101 according to the present exemplary embodiment. The processing corresponds to the processing in step S606 in FIG. 6.

In step S717, the job setting management unit 406 acquires the job setting information list received from the image forming device 104 via the network control unit 405.

In step S718, the job setting management unit 406 reads out the job setting information one by one from one or more pieces of job setting information included in the received job setting information list, and determines whether the same setting has been stored in the data processing device 101. When the job setting information in the received job setting information list has been stored (Yes in step S718), the operation proceeds to step S720. When the job setting information in the received job setting information list is not stored (No in step S718), the operation proceeds to step S719.

In step S719, the job setting management unit 406 adds job setting information that has not been stored to a display list.

In step S720, the job setting management unit 406 determines whether there is any job setting information that has not been read out from the job setting information list received from the image forming device 104. When there is unread-out job setting information (Yes in step S720), the operation proceeds to step S718 and repeats the same flow for the unread-out job setting information. When there is no unread-out job setting information (No in step S720), the operation proceeds to step S721.

In step S721, based on the display list created in step S719, the job setting management unit 406 instructs the UI control unit 402 to display the job setting information. That is, here, the job setting information included in the job setting information list received from the image forming device 104 and not registered in the data processing device 101 is displayed on the data processing device 101. The flow illustrated in FIG. 7D can display a list of the information acquired by the data processing device 101 and registered in the image forming device 104, and not registered in the data processing device 101. Here, the information not registered in the data processing device 101 is displayed in the list, but all pieces of the information acquired from the image forming device 104 may be displayed.

FIG. 7E is a flowchart of the job setting information registration processing in the data processing device 101 according to the present exemplary embodiment. The processing corresponds to the processing in step S607 in FIG. 6.

In step S722, the job setting management unit 406 accepts the user selection operation on the job setting information list screen displayed in step S721. Then, the operation proceeds to step S723.

In step S723, the job setting management unit 406 adds the job setting information selected by the user to the registration list. In addition, by accepting the user operation in step S722, the selected job setting information is registered in the data processing device 101. This is not seen to be limiting, and in another exemplary embodiment, all pieces of the job setting information displayed on the data processing device 101 may be automatically registered in the data processing device 101 without any user operation. With this, simply by causing the data processing device 101 to touch the image forming device 104, the user can automatically register, in the data processing device 101, the setting information registered in the image forming device 104.

In step S724, the job setting management unit 406 stores, in the RAM 303 or the HDD 305, the registration list created in step S723, and instructs the UI control unit 402 to display the stored job setting information on the display 214 of the data processing device 101.

Figure 8:
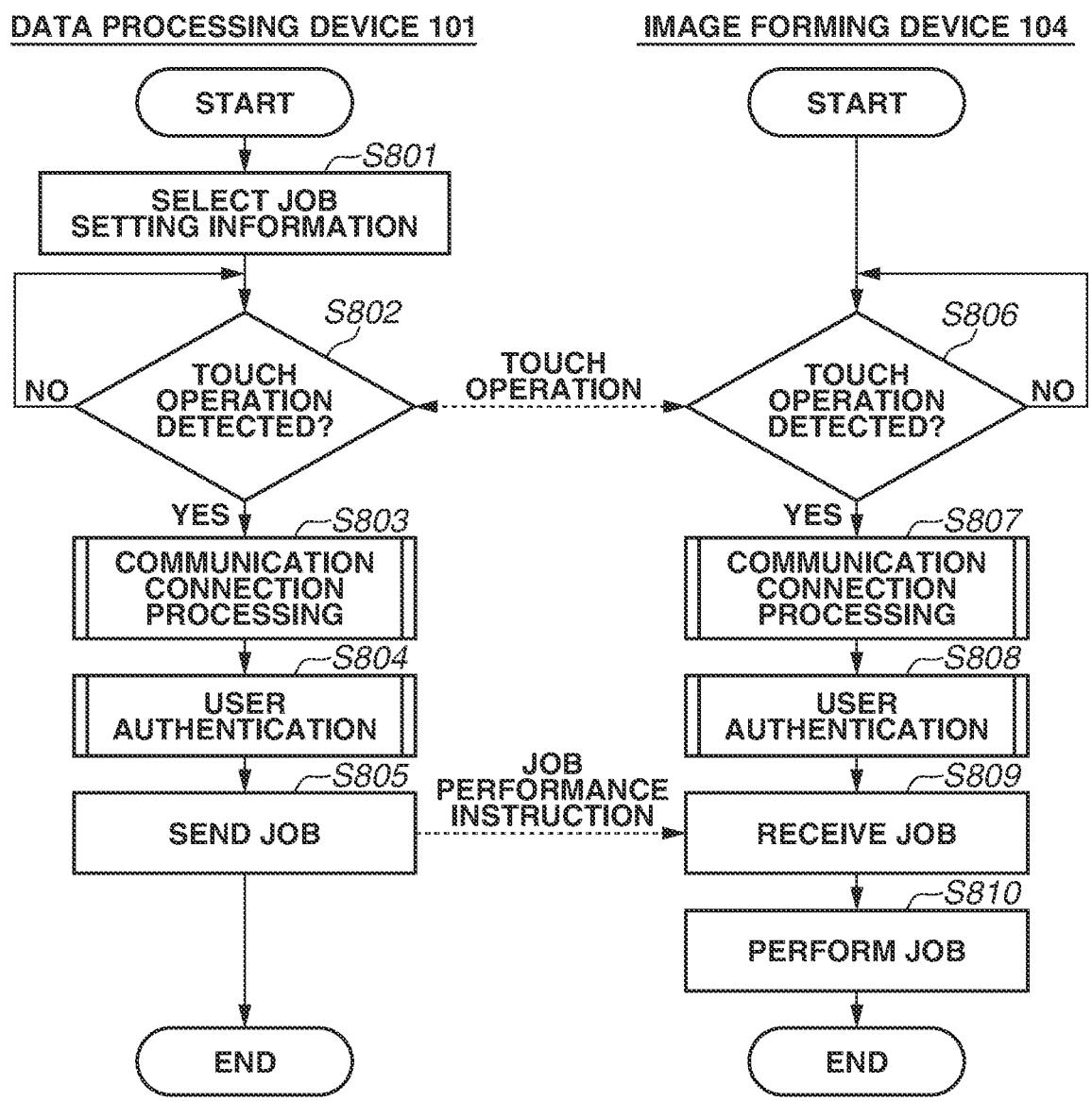
FIG. 8 is a diagram illustrating a flowchart of job performance processing according to the first exemplary embodiment.

FIG. 8 is a flowchart illustrating a job performance processing in the data processing device 101 and the image forming device 104 according to the present exemplary embodiment.

Steps S801 to S805 in FIG. 8 constitute a flow performed by the CPU 202 according to the application 401 stored in the RAM 204 and the storage device 209 included in the data processing device 101. Further, Steps S802 to S804 are the same as steps S601 to S603 in FIG. 6, so description thereof is omitted.

In step S801, the job setting management unit 406 acquires, from the UI control unit 402, the job setting information selected by the user. Here, the job setting information selected by the user is the setting information registered in FIG. 7E, the setting information such as "preset" and "favorite" registered in the data processing device 101 in advance, or the like.

In step S805, the job control unit 407 sends the job, which is based on the job setting information selected in step S801, to the image forming device 104 via the network control unit 405.

Steps S806 to S810 in FIG. 8 constitute a flow performed by the CPU 302 according to the application 501 stored in the RAM 303 and the HDD 305 included in the image forming device 104. Steps S806 to S808 are the same as steps S608 to S610 in FIG. 6, so description thereof is omitted.

In step S809, the job control unit 507 receives the job received from the data processing device 101 by the network control unit 505. Then, the operation proceeds to step S810.

In step S810, the job control unit 507 performs the processing by operating a functional processing unit of any of the scan processing unit 511, the copy processing unit 512, the print processing unit 513, and the fax processing unit 514 based on the job setting information, or the like of the received job.

According to the flowchart illustrated in FIG. 8, the user selects a desired setting on the data processing device 101 and merely touches the image forming device 104, so that the user can cause the image forming device 104 to perform the processing at the desired setting.

FIGS. 9A and 9B are diagrams each illustrating an example of the setting information managed by the image forming device 104 according to the present exemplary embodiment.

FIG. 9A illustrates a job setting information list related to "favorite" and "preset" registered and managed by the image forming device 104. In addition, FIG. 9B illustrates a job history information list related to the "history" registered and managed by the image forming device 104.

A job setting information list 901 related to "favorite" and "preset" is composed of an identifier (id) 902 column, a type 903 column, a user 904 column, a job type 905 column, and a parameter list 906 column of the job. The parameter list 906 includes settings such as the number of copies and the size. The "preset" setting information registered in advance in the image forming device 104 corresponds to "favorite" setting information registered by the user in the image forming device 104.

A job history list 907 consists of a time 908 column, a type 909 column, a user 910 column, a job type 911 column, and a parameter list 912 column. The history of the processing performed by the image forming device 104 and the setting information corresponding to the processing are set forth.

In the job setting information lists illustrated in FIGS. 9A and 9B, when the type of the job is "favorite" or "preset", the id is assigned to each job setting information, and when the type of the job is "history", the time information whose job is performed is assigned. In the user 904 column, name of the user who registers and manages the job setting information is displayed. The information of the user name corresponding to the authentication information sent from the data processing device 101 is returned to the data processing device 101. The job type 905 column displays information on the job type such as scan, print, copy, and fax. Also, in the parameter list 906 column, the setting contents are stored for each job setting information.

The data processing device 101 acquires the job setting information list generated and managed by the image forming device 104, and registers the job setting information list in the data processing device 101, so that the settings such as "favorite" and "preset" registered in the image forming device 104 can be used on the data processing device 101.

FIGS. 10A through 10E are screen flow diagrams relating to the acquisition and registration of the job setting information by the data processing device 101 according to the present exemplary embodiment. Referring to FIGS. 10A through 10E, description will be given of a series of user operations of the data processing device 101 related to the acquisition and registration of the job setting information.

Figure 10A:
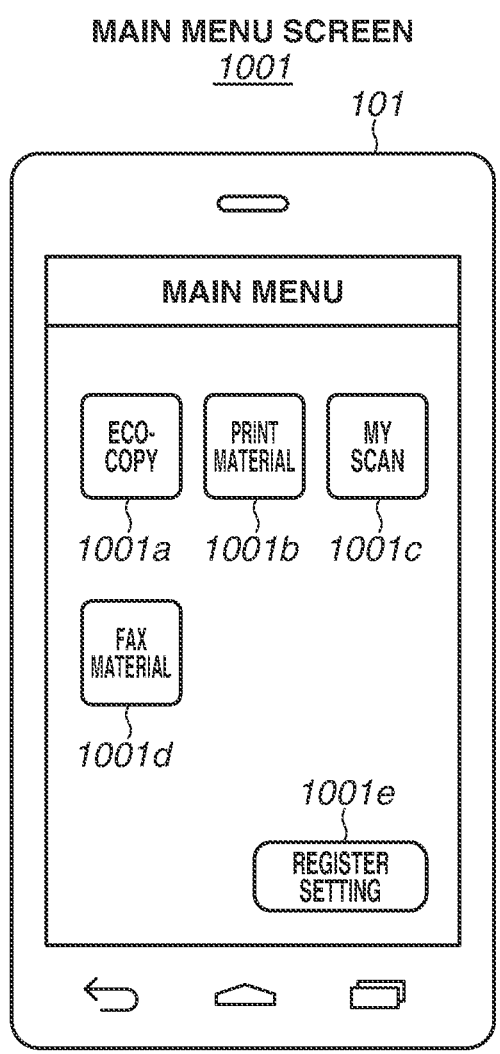

FIG. 10A is a main menu screen of the application 401. On a main menu screen 1001, buttons 1001a to 1001d corresponding to the pre-registered job setting information, and a setting registration button 1001e are displayed. When the user presses the setting registration button 1001e, the screen changes to the screen illustrated in FIG. 10B. The buttons 1001a to 1001d correspond to pre-registered preset buttons.

Figure 10B:
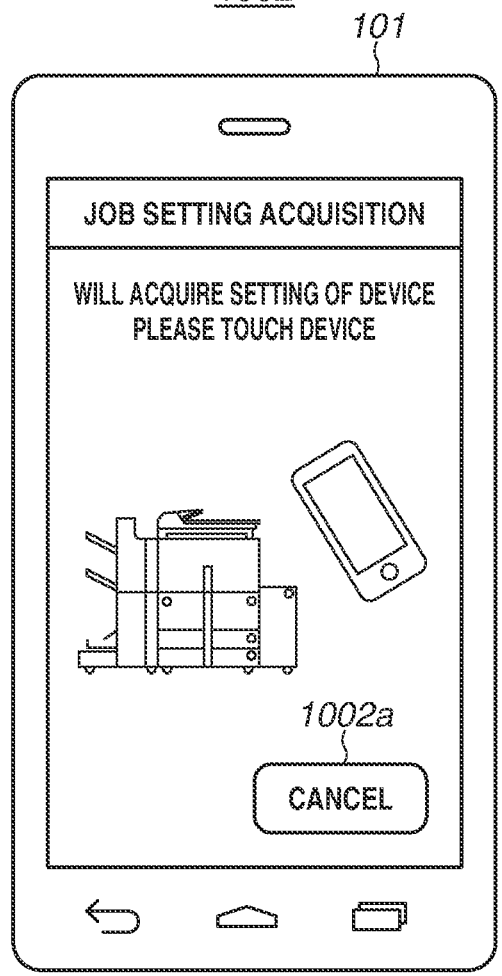

FIG. 10B is an instruction screen for acquiring the job setting information. A job setting information acquisition instruction screen 1002 instructs the user to cause the data processing device 101 to touch the image forming device 104. When the user causes the data processing device 101 to touch the image forming device 104 on this screen, steps S601 to S605 in the flowchart illustrated in FIG. 6 are performed, and the screen changes to the screen illustrated in FIG. 10C. When the user presses a cancel button 1002a, the screen returns to the main menu screen 1001.

FIG. 10C is a list display screen of the job setting information, and is a screen displayed in step S606 in the flowchart of FIG. 6. On a list display screen 1003 of the job setting information, a list of settings based on the job setting information list acquired from the image forming device 104 is displayed by the touch operation. In FIG. 10C, pieces of job setting information 1003a to 1003e acquired from the job setting information list 901 as illustrated in FIG. 9A are displayed. On the list display screen 1003, the user can select the job setting information to be registered in the data processing device 101. For example, when the user selects pieces of the setting information 1003a and 1003c (in step S722 in FIG. 7E) and then presses an OK button 1003g, the screen changes to the screen in FIG. 10D.

At this time, on the list display screen 1003, all pieces of the job setting information acquired from the image forming device 104 may be displayed, or only information frequently used in the past may be displayed.

Figure 10D:
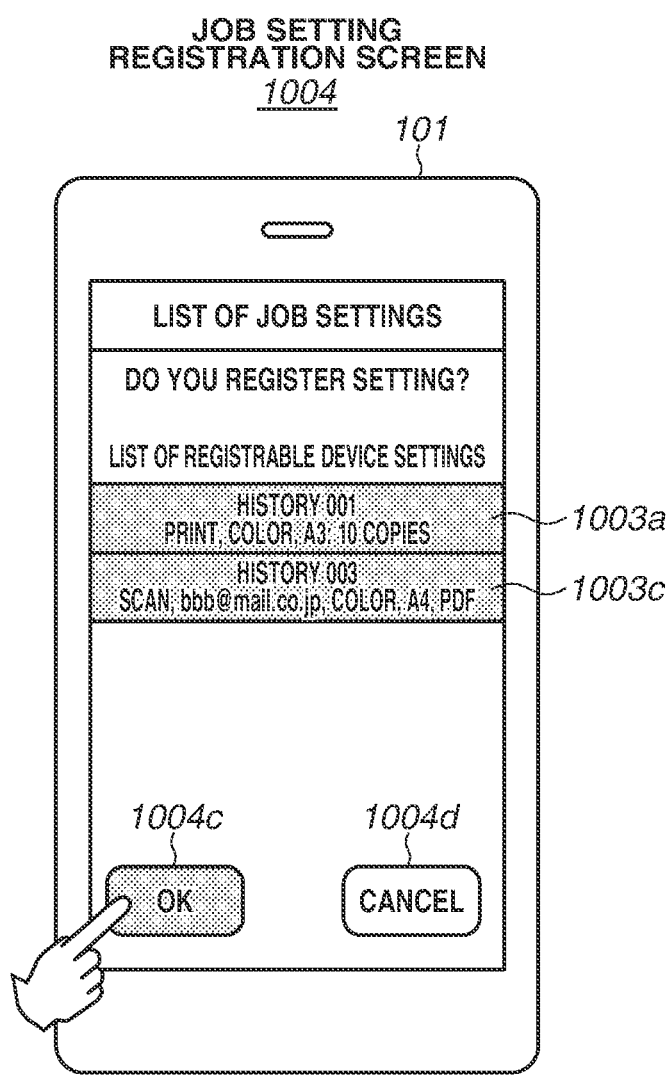

FIG. 10D is a registration screen of the job setting information. On a registration screen 1004, the pieces of the setting information 1003a and 1003c selected by the user on the job setting list display screen 1003 are displayed. When the user presses an OK button 1004c, the screen changes to the screen illustrated in FIG. 10E. When the user presses a cancel button 1004d, the screen returns to the job setting list display screen 1003.

Figure 10E:
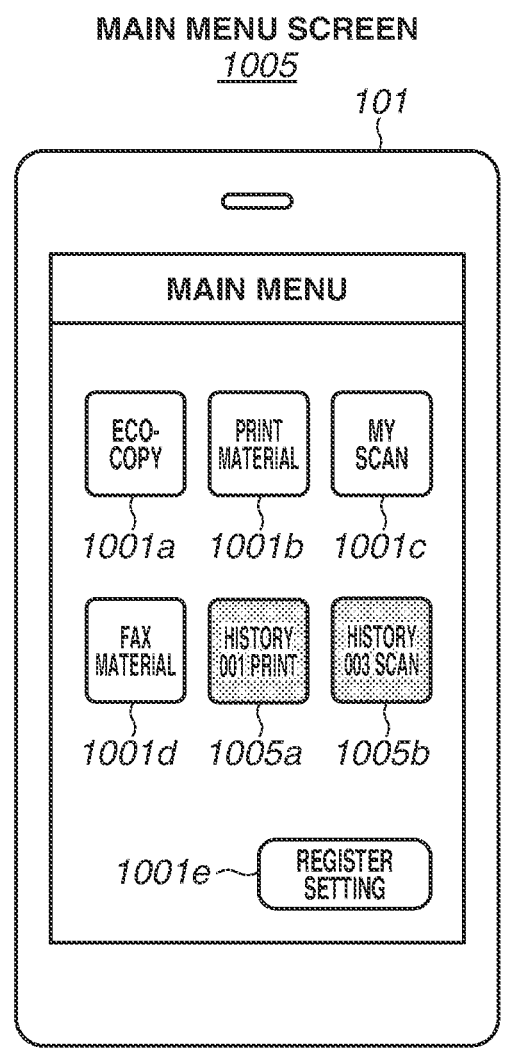

FIG. 10E illustrates a main menu screen of registered job setting information. On a main menu screen 1005, in addition to the various pre-registered job setting buttons 1001a to 1001d, newly registered job setting buttons 1005a and 1005b are displayed.

Here, an example is stated in which the data processing device 101 acquires information from the job setting information list 901 of the image forming device 104. However, not limited to this, the data processing device 101 may acquire, from the image forming device 104, the history information from the job history list 907, and display the history information in a list.

Further, the data processing device 101 may acquire, from the image forming device 104, information according to the screen displayed on the data processing device 101 at the time of touching. At this time, the data processing device 101 sends, to the image forming device 104, the information on the screen displayed at the time of touching or the acquisition request of the information according to the screen. Then, in steps S611 and S612 in FIG. 6, the image forming device 104 changes the setting information to be sent to the data processing device 101 in response to the screen information or the acquisition request sent from the data processing device 101.

For example, when the data processing device 101 is touched while displaying the job setting information acquisition instruction screen 1002, the job setting information corresponding to the "preset" and "favorite" registered in the image forming device 104 is acquired from the image forming device 104. When the data processing device 101 is touched while displaying the history information acquisition instruction screen (not illustrated), the history information registered in the image forming device 104 is acquired from the image forming device 104.

As described above, by simply causing the mobile terminal to touch the image forming device 104, the user can perform communication connection, authentication, and acquisition of the setting information registered in the image forming device. Therefore, to the mobile terminal, the user can import the setting information registered in the image forming device 104, without performing complicated operations. Then, the setting information imported to the mobile terminal can be registered in the mobile terminal and used at any time. In addition, at the time of the touch operation, the setting information acquired from the image forming device 104 such as "favorite" and "history" can be changed according to the screen displayed on the mobile terminal. By doing so, the user can intuitively acquire the desired setting information from the image forming device 104. Further, in the present exemplary embodiment, the example of importing, to the mobile terminal, the "favorite" setting and history information registered in the image forming device 104 is stated, but the information to be imported is not limited to the above. For example, it may be any setting information that has been frequently performed by the image forming device 104 or any information of the processing that has been performed most recently by the image forming device 104.

In the first exemplary embodiment, the example has been stated in which, by the touch operation of the user, the data processing device 101 acquires the job setting information from the image forming device 104, and registers the job setting information. The second exemplary embodiment describes a method in which, when the data processing device 101 is touched, the data processing device 101 acquires the information corresponding to the screen displayed by the image forming device 104. Since the basic configuration of the present exemplary embodiment is the same as that of the first exemplary embodiment, only the difference is described.

Figure 11A:
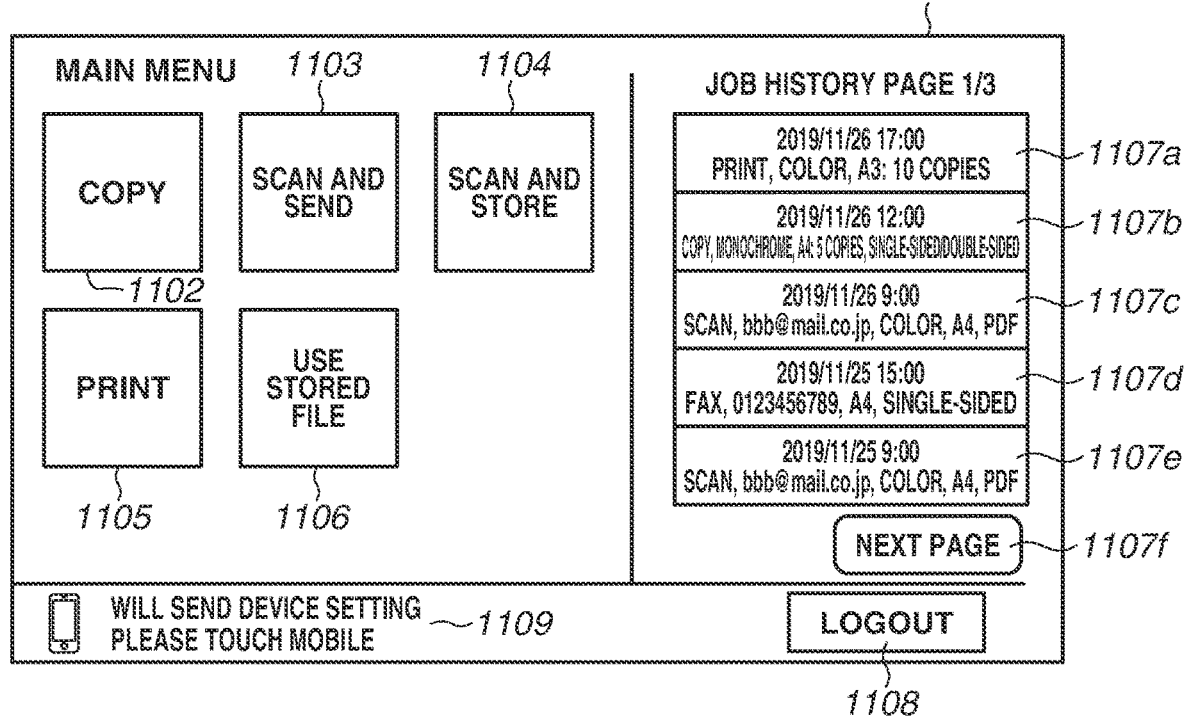
FIGS. 11A and 11B are diagrams illustrating screens relating to job setting transmission by an image forming device according to a second exemplary embodiment.
Figure 11B:
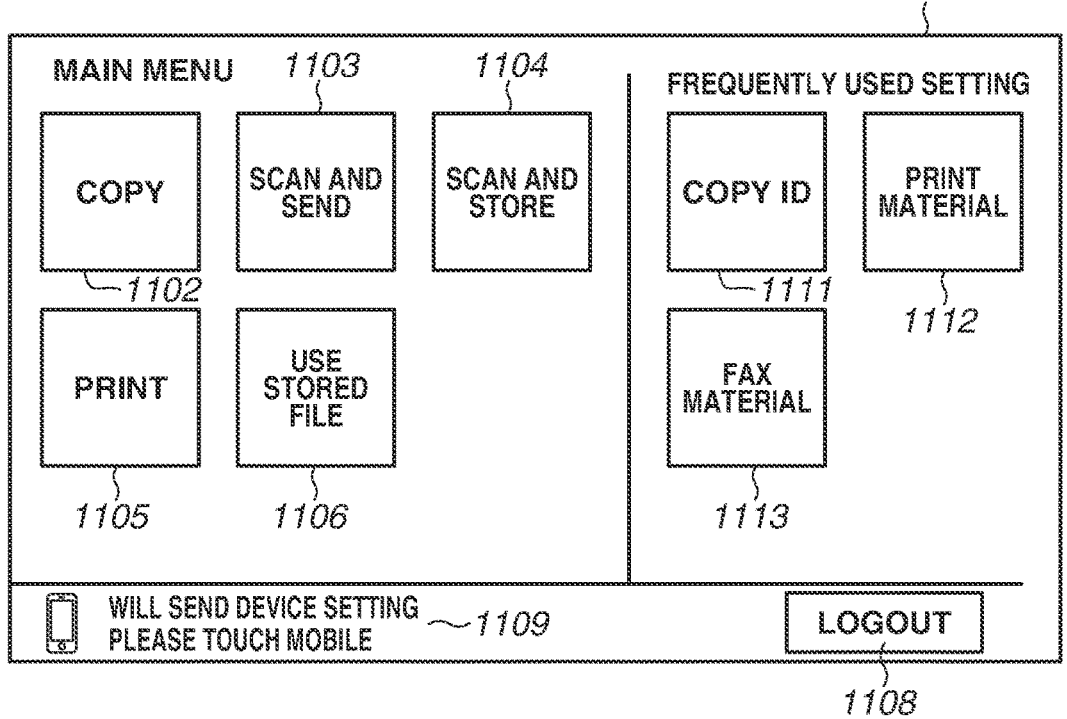

FIGS. 11A and 11B are each an example of the screen displayed on the image forming device 104 according to the present exemplary embodiment.

FIG. 11A illustrates a main menu screen 1101. In FIG. 11A, the main menu screen 1101 displays a list of job setting buttons 1102 to 1106 placed by default and pieces of job history information 1107a to 1107e which are based on the job history list 907 of FIG. 9B. In FIG. 11B, frequently used setting buttons 1111 to 1113 such as "favorite" and "preset" are displayed on a main menu screen 1110. In this way, the user can check the job history information and the frequently used job setting information from the main menu of the image forming device 104.

Further, on the main menu screens 1101 and 1110, a guidance indication 1109 for instructing the user to cause the data processing device 101 to touch the image forming device 104 is displayed. With the guidance indication 1109 displayed on the main menu screens 1101 and 1110, the user causes the data processing device 101 to touch the image forming device 104. With this, when the main menu screen 1101 is displayed, the data processing device 101 can acquire the history information, and when the main menu screen 1110 is displayed, the data processing device 101 can acquire the frequently used setting information.

FIGS. 12A through 12C are screen flow diagrams related to the information acquisition and registration by the data processing device 101 according to the present exemplary embodiment. Since the screen flow diagrams of the present exemplary embodiment are the same as the screen flow diagrams of FIGS. 10A through 10E of the first exemplary embodiment except for the main menu screen, description will be focused on the main menu screen.

FIG. 12A is a main menu screen 1201 before the information registration. On the main menu screen 1201, the setting registration button 1001e on the main menu screen 1001 in FIG. 10A is not displayed. This is because the touch operation instruction for information acquisition is displayed on the image forming device 104 side, as illustrated in FIGS. 11A and 11B. When the user performs the touch operation while the main menu screen 1201 is displayed, the list display screen of the acquired information as illustrated in FIG. 10C will be displayed. When the touch operation of the data processing device 101 is performed while the image forming device 104 is displaying the screen illustrated in FIG. 11A, the image forming device 104 sends the history information to the data processing device 101. When the user selects, from the sent history information, the history to be registered in the data processing device 101, the data processing device 101 displays the screen in which the history information is registered as illustrated in FIG. 12B. Similarly, if the touch operation of the data processing device 101 is performed when the image forming device 104 is displaying the screen illustrated in FIG. 11B, the data processing device 101 displays the screen where "frequently used settings" are registered as illustrated in FIG. 12C.

As described above, in the present exemplary embodiment, according to the screen displayed by the image forming device 104, the data processing device 101 can change the information to be acquired.

Other Exemplary Embodiments

In the first exemplary embodiment and the second exemplary embodiment, the information acquired by the data processing device 101 is changed, according to the screen displayed on the data processing device 101 or the image forming device 104 at the time of the touch operation. Not limited to this, for the job performance instruction, the data processing device 101 may acquire the setting information from the image forming device 104 at the time of the touch operation (step S802 in FIG. 8 of the first exemplary embodiment).

OTHER EMBODIMENTS

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, these embodiments are not seen to be limiting. The scope of the following claims is to be accorded the broadest interpretation so as to encompass all such modifications and equivalent structures and functions.

What is claimed is:

1. A method performed by a terminal, the method comprising:
    displaying a first screen as a selecting screen for selecting a function to be used, wherein the first screen includes a first key, a second key for causing an image processing device to execute a print function, and a third key for causing the image processing device to execute a scan function;
    displaying a predetermined screen according to selection of the first key, the predetermined screen prompting a user to bring the terminal close to the image processing device, wherein the predetermined screen includes an image that represents an image processing device and an image that represents a terminal;
    receiving predetermined information from the image processing device in a case where the terminal is brought close to the image processing device on a display unit of the image processing device of which a screen prompting the user to bring the terminal close to the image processing device is displayed in a state that the predetermined screen is displayed; and
    displaying a screen which is the selecting screen and includes information about the received predetermined information, wherein the screen which is the selecting screen includes the second key and the third key.

2. The method according to claim 1, wherein at least one information included in the predetermined information is stored.

3. The method according to claim 1, wherein at least one information included in the predetermined information is registered.

4. The method according to claim 1, wherein at least one information included in the predetermined information is a button indicating at least one information included in the predetermined information.

5. The method according to claim 1, wherein at least one information included in the predetermined information is setting information about at least one function of a plurality of functions including at least the scan function and the print function.

6. The method according to claim 5, wherein a job using the setting information is transmitted to the image processing device.

7. The method according to claim 1, wherein, in a case of detecting that the terminal is brought close to the image processing device in a state that the predetermined screen is displayed, the predetermined information is received from the image processing device.

8. The method according to claim 1, wherein the predetermined screen includes a message for prompting the user to bring the terminal close to the image processing device.

9. The method according to claim 1, wherein the first screen is a screen for selecting the function to be executed by the image processing device from among a plurality of functions including at least the scan function and the print function.

10. The method according to claim 1, further comprising:
    acquiring connection information from the image processing device in a case where the terminal is brought close to the image processing device in a state that the predetermined screen is displayed; and
    establishing a connection for wireless local area network (LAN) communication with the image processing device by using the acquired connection information.

11. The method according to claim 10, wherein at least one information included in the predetermined information is acquired via the wireless LAN communication between the terminal and the image processing device.

12. The method according to claim 10, wherein at least one information included in the predetermined information is acquired after establishment of a connection via the wireless LAN communication between the terminal and the image processing device.

13. The method according to claim 1, wherein, in a case where the image processing device and the terminal establish a connection for near field communication in a state that the predetermined screen is displayed, the connection information is acquired from the image processing device.

14. The method according to claim 1, wherein the predetermined screen is a screen to be displayed next after the first screen, based on a selection of the first key.

15. The method according to claim 1, wherein the information about the predetermined information is displayed on the screen prompting the user to bring the terminal close to the image processing device and being displayed on the display unit of the image processing device.

16. The method according to claim 15, wherein the information about the predetermined information is information that shows a history of a job executed on the image processing device.

17. The method according to claim 15, wherein the information about the predetermined information is information that shows a setting used frequently on the image processing device.

18. A terminal comprising:
    one or more processors; and
    at least one memory storing executable instructions, which when executed by the one or more processors, cause the terminal to:
        display a first screen as a selecting screen for selecting a function to be used, wherein the first screen includes a first key, a second key for causing an image processing device to execute a print function, and a third key for causing the image processing device to execute a scan function;
        display a predetermined screen according to selection of the first key, the predetermined screen prompting a user to bring the terminal close to the image processing device, wherein the predetermined screen includes an image that represents an image processing device and an image that represents a terminal;
        receive predetermined information from the image processing device in a case where the terminal is brought close to the image processing device on a display unit of the image processing device of which a screen prompting the user to bring the terminal close to the image processing device is displayed in a state that the predetermined screen is displayed; and display a screen which is the selecting screen and includes information about the received predetermined information, wherein the screen which is the selecting screen includes the second key and the third key.

19. A non-transitory computer-readable medium storing executable instructions, which when executed by one or more processors of a terminal, cause the terminal to:

display a first screen as a selecting screen for selecting a function to be used, wherein the first screen includes a first key, a second key for causing an image processing device to execute a print function, and a third key for causing the image processing device to execute a scan function;

display a predetermined screen according to selection of the first key, the predetermined screen prompting a user to bring the terminal close to the image processing device, wherein the predetermined screen includes an image that represents an image processing device and an image that represents a terminal;

receive predetermined information from the image processing device in a case where the terminal is brought close to the image processing device on a display unit of the image processing device of which a screen prompting the user to bring the terminal close to the image processing device is displayed in a state that the predetermined screen is displayed; and display a screen which is the selecting screen and includes information about the received predetermined information, wherein the screen which is the selecting screen includes the second key and the third key.

* * * * *